United States Patent [19]
Terry, Sr. et al.

[11] Patent Number: 5,626,401
[45] Date of Patent: May 6, 1997

[54] SPOKED WHEEL HUB

[75] Inventors: Maurice C. Terry, Sr., Bellevue; Stephen G. Christ, Bellingham, both of Wash.

[73] Assignee: Innovative Bicycle Components Company, Bellevue, Wash.

[21] Appl. No.: 243,973

[22] Filed: May 17, 1994

[51] Int. Cl.⁶ ................................................. B60B 1/14
[52] U.S. Cl. ........................ 301/59; 301/110.5; 301/104
[58] Field of Search ............................ 301/54, 55, 56, 301/57, 58, 59, 60, 61, 104, 110.5, 110.6

[56] References Cited

U.S. PATENT DOCUMENTS

| | | | |
|---|---|---|---|
| 596,261 | 12/1897 | Croskey | 301/56 |
| 612,323 | 10/1898 | Fraser | 301/61 |
| 742,503 | 10/1903 | Seeds | 301/61 |
| 5,332,294 | 7/1994 | Haeussinger | 301/110.5 |
| 5,429,412 | 7/1995 | Watson | 301/59 X |
| 5,429,421 | 7/1995 | Watson | 301/61 |

FOREIGN PATENT DOCUMENTS

| | | | |
|---|---|---|---|
| 371295 | 1/1907 | France | 301/59 |
| 2501124 | 9/1982 | France | 301/110.5 |
| 14448 | 11/1885 | United Kingdom | 301/55 |
| 13191 | 9/1887 | United Kingdom | 301/57 |
| 338561 | 11/1930 | United Kingdom | 301/59 |

*Primary Examiner*—Russell D. Stormer
*Attorney, Agent, or Firm*—Curtis, Morris & Safford, P.C.

[57] ABSTRACT

A hub assembly for a bicycle or other human powered vehicle. The hub assembly provides a unique design for use with straight pull spokes having enlarged retention ends with no bends that can be dropped into retention cavities and retention slots in a spoke ring of the hub assembly. The hub assembly is also universally adaptable to any wheel employing standard rim brakes or any wheel with a disc brake rotor attached, and/or with all existing sprocket drive lines (freewheels, cassette bodies), in any configuration, by simply replacing or slightly modifying one or a few components. The novel hub assembly provides a quick-release feature without the need for a quick-release skewer, but can still readily be adapted to use a conventional skewer.

15 Claims, 6 Drawing Sheets

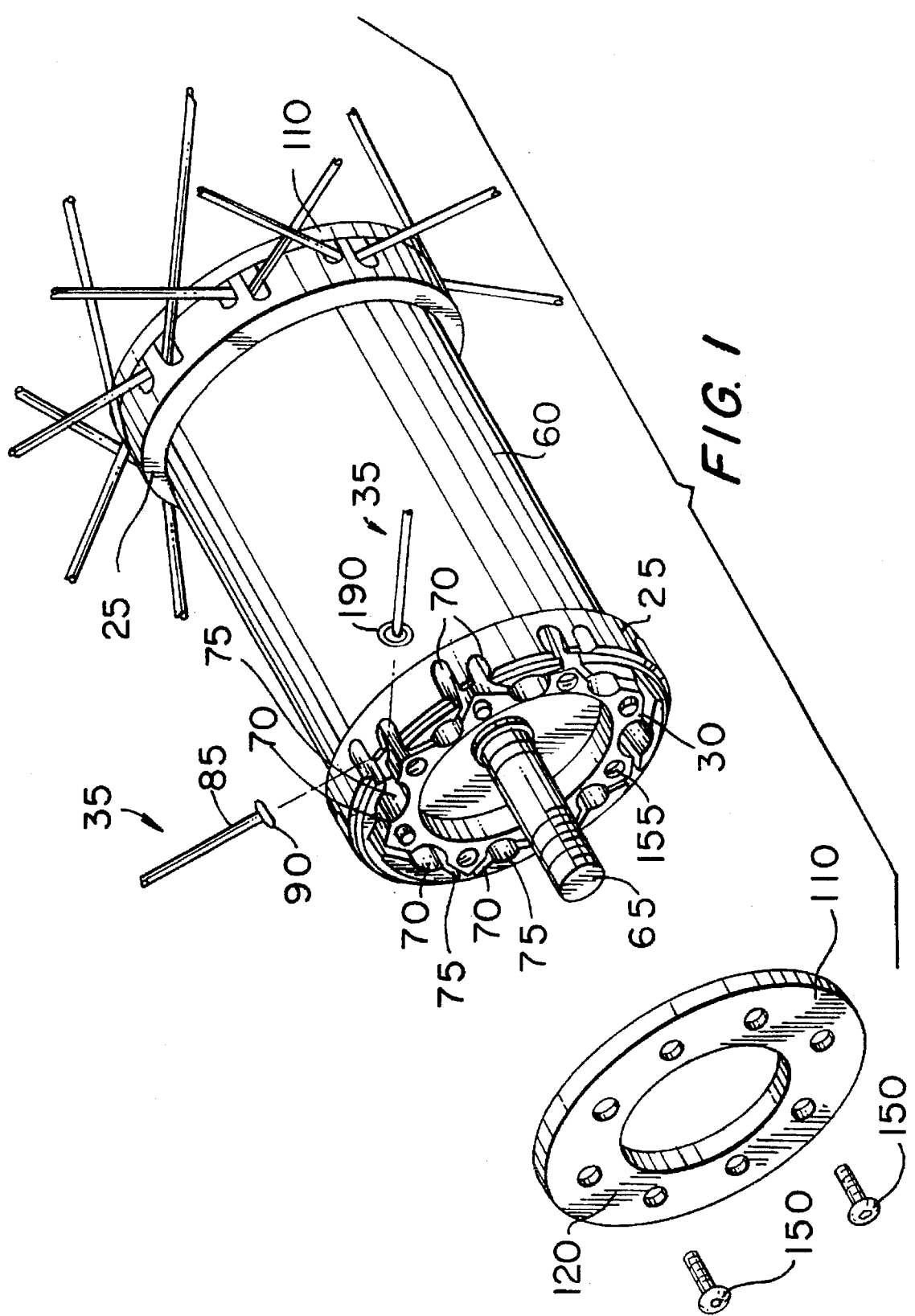

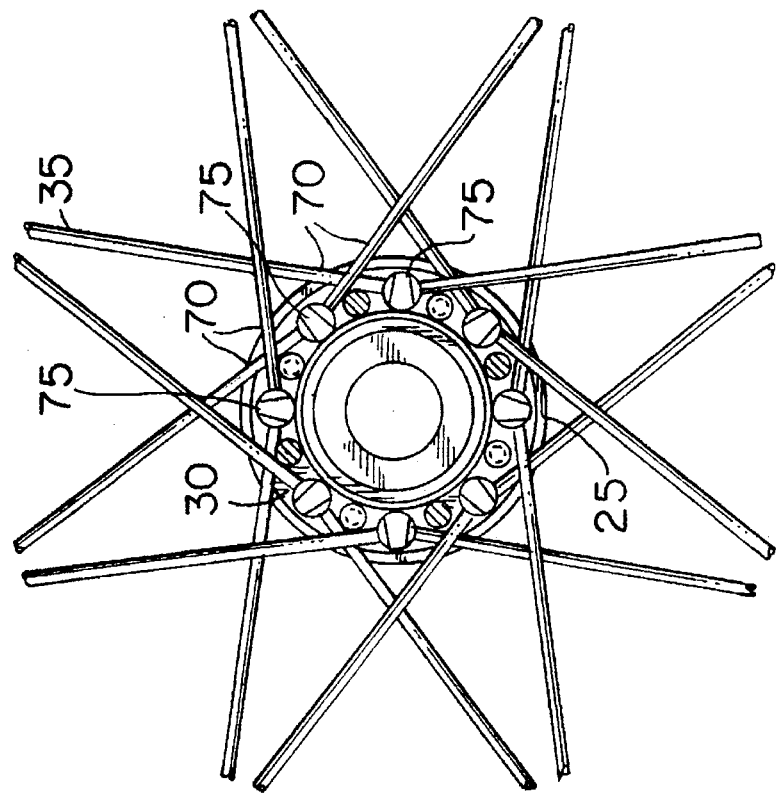
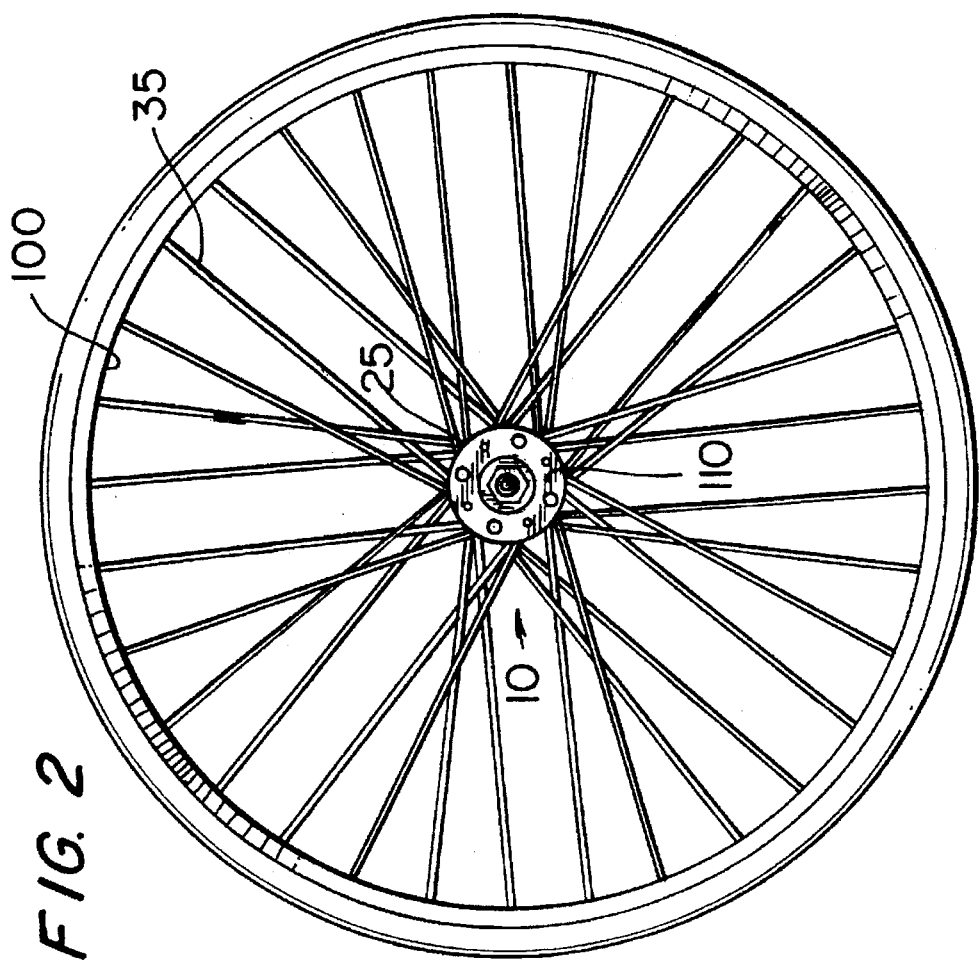

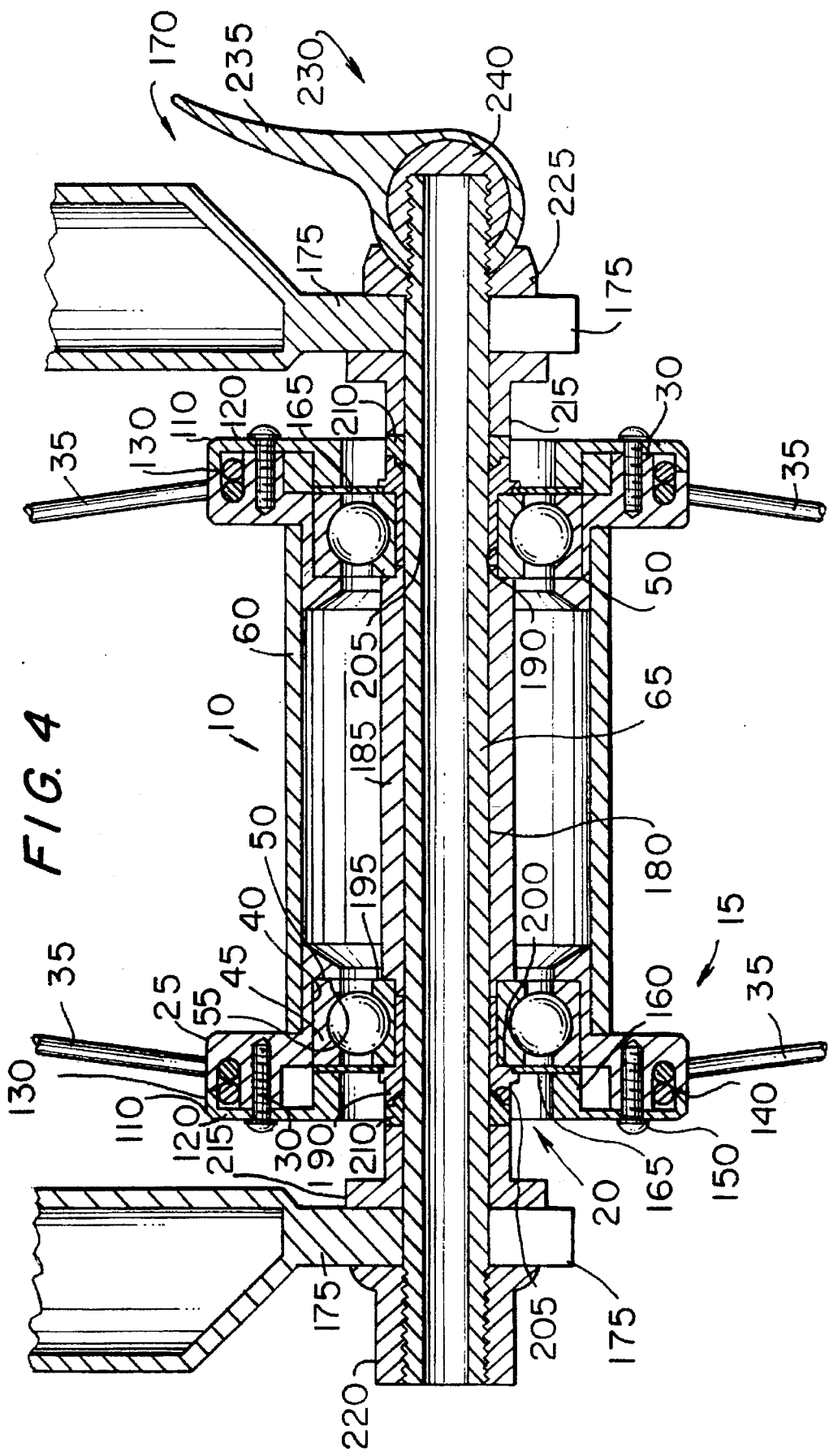

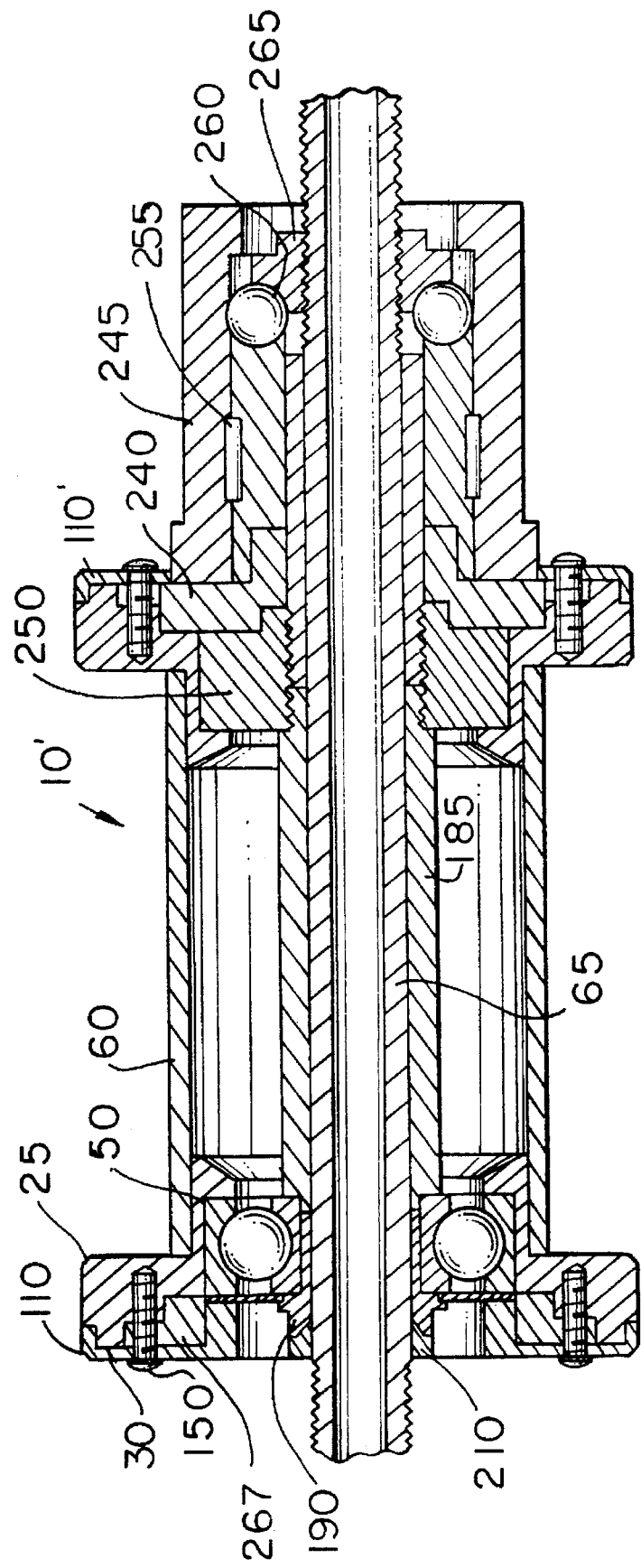

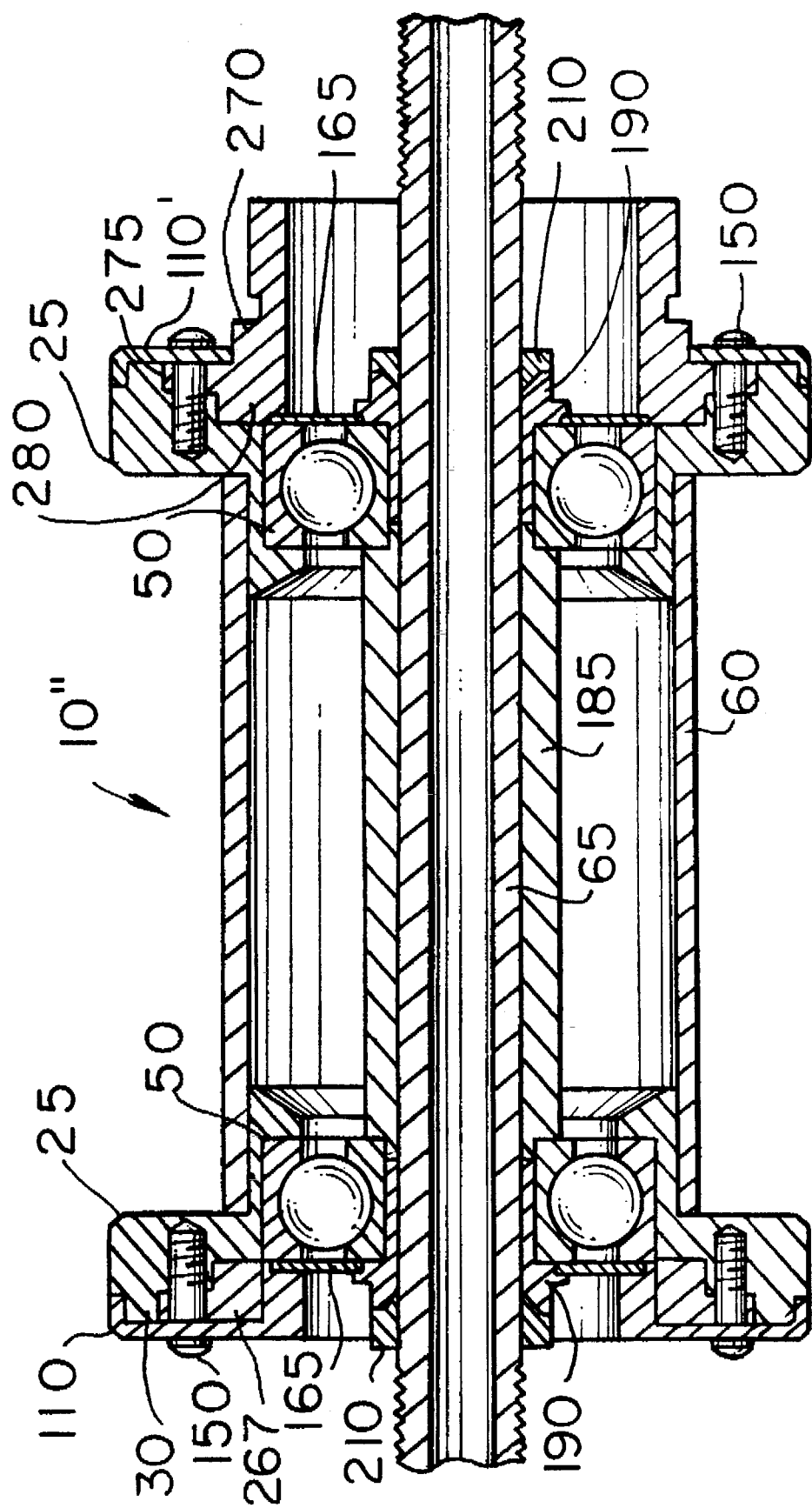

SPOKED WHEEL HUB

FIELD OF THE INVENTION

The present invention relates to spoked wheel hubs used in bicycles and other human powered vehicles.

BACKGROUND OF THE INVENTION

Decades of research have been undertaken to develop hubs for a bicycle, multiple rider tandems and other human powered vehicles (HPV). A vast number of sizes, shapes, configurations and materials have been proposed, some of which are in current use.

Although many current hub designs are serviceable, current hub designs are usually limited to use in a narrow range of wheel configurations. For example, one hub design is used where a rim brake is used, another where a disk brake is used, another where the hub is for a rear wheel employing a drive sprocket, and so on. This requires a bicycle or HPV manufacturer to have a large inventory of different hubs.

Most hubs in current use rely exclusively upon a design using a spoke having a 90 degree bend at one end, to be attached to the retaining flange of the hub, and threaded at the other, to be attached to the wheel rim. These spokes are individually laced through holes in the hub retaining flange and attached by means of threaded nipples to the wheel rim.

The spoke hole size and pattern is essentially the same on all prior art designs. The differences are for the most part found in number of spokes, materials, gauge of wire used and rim nipple design. Nipples vary because they are used to adapt and secure the spoke ends in the many types of rims available in the marketplace.

Straight spokes, enlarged at one end and being threaded at the other, have been in use on motorcycles for some time. The straight spokes used on motorcycles are individually laced into holes in the hub. This is cumbersome and requires skilled labor.

Because the hub used with these straight spokes is larger than a typical bicycle hub, straight spokes have only recently been used on bicycles or other HPV's. Also, the straight spokes still need to be individually laced, eliminating any significant advantage to the use of straight spokes over the customarily used 90 degree bent spokes, except for strength.

Known wheel hubs frequently include a quick release feature. These known quick release wheel hubs employ a hollow axle shaft through which passes a solid shaft, typically called a skewer, with an adjustable nut on one end and an eccentrically mounted lever or the other. When the eccentrically mounted lever is acuated it acts as a clamping device to retain the axle in the drop-out slot in which the wheel resides in the front fork or rear frame. Although such known quick release hubs are satisfactory for many purposes, the use of the separate skewer necessitates the use of a hollow axle, increases manufacturing cost and in some cases cannot provide sufficient clamping power to stablilize the struts of a front suspension fork on a bicycle.

OBJECTS OF THE INVENTION

It is an object of the present invention to provide a bicycle or HPV hub that uses straight pull spokes.

It is another object of the present invention to provide a universal bicycle or HPV hub wherein the spokes may be dropped into place.

It is another object of the present invention to provide a universal bicycle or HPV hub that does not require spokes to be laced through holes in the hub.

It is another object of the present invention to provide a drop-in means of installing straight-pull spokes in the hub that is secure.

It is another object of the present invention to provide a bicycle or HPV hub that provides a means for installing generally opposed spokes.

It is another object of the present invention to provide a stronger hub that is modular in construction such that it is universally adaptable for use on any wheel, including plain wheels and those using either standard rim brakes, disc brakes of any known design, drive sprockets and other configurations.

It is another object of the present invention to provide a bicycle or HPV hub that may use a "mix or match" component selection in the hub assembly to suit individual requirements.

It is another object of the present invention to provide a universal bicycle or HPV hub that significantly reduces the labor time to build a wheel.

It is another object of the present invention to provide a universal bicycle or HPV hub that may be built into a wheel by inexperienced labor.

It is another object of the invention is to provide a hub for a bicycle or other HPV having an axle shaft that requires no skewer running coaxially through it, but is itself the axle on which the wheel turns and provides a means for a quick release function, while still providing the additional capability of using any of the quick release skewers in present use, if desired.

SUMMARY OF THE INVENTION

These and other objects of the present invention are accomplished in a wheel spoke hub assembly for bicycles and the like, comprising a hub ring having an interior face and an exterior rim portion, and drop-in straight pull spokes each having a straight section and an enlarged retention end, said interior face of said hub ring having retention openings therein for receiving the straight section of said drop-in straight pull spokes, said retention openings being smaller than the enlarged retention end of said spokes to axially retain said spokes.

These objects are also accomplished in this invention by means of a modular, spoked hub for bicycles and the like, comprising a rotating assembly including a first hub ring including a face having retention slots for receiving and axially retaining drop-in straight pull spokes, a bore and a seat for receiving and seating the outer race of a first bearing, and means for retaining said outer race against said seat; a second hub ring, including a face having retention slots for receiving and axially retaining drop-in straight pull spokes, a bore and a seat for interchangeably receiving and seating a first member taken from the group of the outer race of a second bearing and a connector for a splined cassette body adapter, or being left left unused; a recess for interchangeably receiving a second member taken from the group of a splined cassette body adapter, a threaded cassetter adapter, and a threaded disk brake adapter, or being left unused. The spoked hub further includes means for retaining said second member against said hub ring with said first member sandwiched between a portion of said second member and said seat of said first member; and a tube disposed between said first and second hub rings to axially position them in spaced apart relationship. The spoke hub further includes a non-rotating assembly including an axle, a bearing spacer tube, a first washer on said axle to bear on the inner race of said first bearing, between said threaded nut and said bearing spacer tube, and a second washer on said axle to interchangeably retain a member taken from the group of the inner race of said second bearing and a connector for a splined cassette adapter.

The hub of the present invention can also provide a quick release feature eliminating the need for a separate conventional skewer. An overcenter fulcrum device binds and locks the wheel into the dropout slots on the frame of the bicycle or other human powered vehicle using the axle itself. The present invention also provides means to quickly release a wheel using a conventional skewer, if desired.

These and other objects, features and advantages of the present invention will be clear to those skilled in the art upon review of the following detailed description and figures, wherein:

BRIEF DESCRIPTION OF THE DRAWINGS

FIG. 1 is perspective view of a wheel hub in accordance with a preferred embodiment of the present invention, shown with one of the spoke retainer caps removed to show the configuration of the spoke slots and spoke retention cavities.

FIG. 2 is an axial view of the wheel hub depicted in FIG. 1, mounted onto a completed spoked wheel rim.

FIG. 3 is a detailed axial view of a hub ring of the wheel hub depicted in FIG. 1, in accordance with a preferred embodiment of the present invention, with the spokes installed and the spoke retainer cap removed.

FIG. 4 is a sectional view of an assembled wheel hub in accordance with a preferred embodiment of the present invention, mounted to the ends of the downtubes of a bicycle, and having a plain hub and axle-mounted quick-release lever.

FIG. 5 is a sectional view of an assembled wheel hub in accordance with another preferred embodiment of the present invention, with one end of the wheel hub modified to fit a cassette body.

FIG. 6 is a sectional view of an assembled wheel hub in accordance with another preferred embodiment of the present invention, with one end of the wheel hub modified to fit a threaded freewheel adapter.

DETAILED DESCRIPTION

Figure 7:
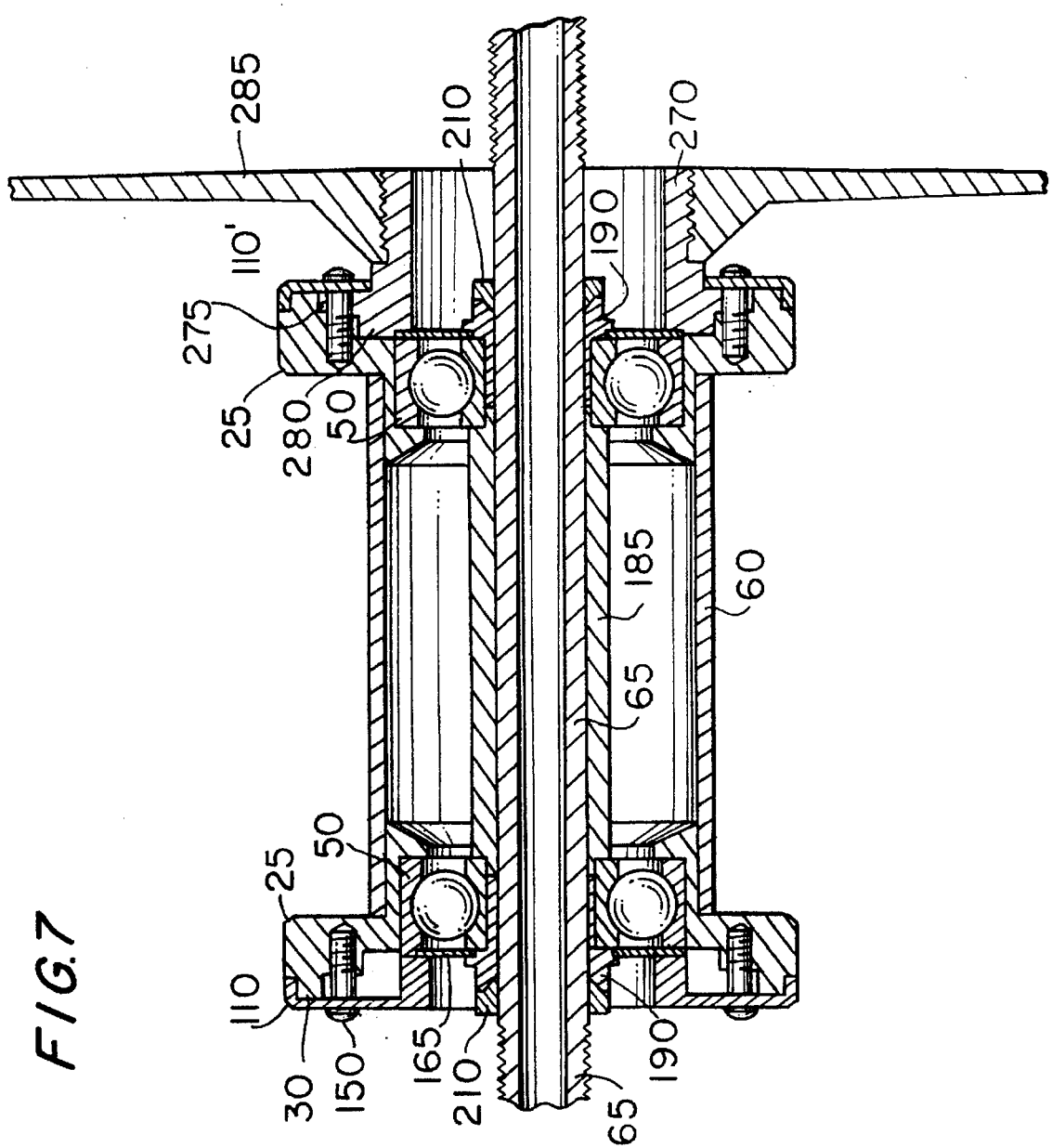
FIG. 7 is a sectional view of an assembled wheel hub in accordance with the invention, like that depicted in FIG. 6, having a brake disk mounted onto the freewheel adapter.

Referring to the drawings in detail, and initially to FIG. 4 thereof, a modular spoked hub assembly 10 in accordance with a preferred embodiment of the present invention is depicted. The hub assembly 10 includes a rotatable portion 15 and a non-rotable portion 20.

Turning first to the rotatable portion 15, the rotatable portion 15 includes two spoke rings 25 having respective flange portions 30 for receiving and retaining wheel spokes 35, in a manner to be described in more detail below, and bearing mounting portions 40, each having a central bore for receiving the outer race 45 of ball bearings 50. The bearing mounting portions 40 also conveniently include a retention lip 55 against which rests the inner face of the outer race 45 of the ball bearings 50. Since the hub assembly 10 depicted in FIG. 4 is intended for use without a disc brake, drive sprocket or other attachments, the two spoke rings 25 are conveniently identical.

The two spoke rings 25 are held in the appropriate spaced apart relationship by hub spacer tube 60. Hub spacer tube 60 can be of any convenient length to suit a wide variety of wheel configurations, without the need to change spoke rings 25. Bearing spacer tube 60 is preferably bonded or otherwise secured to spoke rings 25. This is not mandatory, however, since, as will be seen, the mounting of the bearings 50 themselves tends to fix the position of spoke rings 25, since the inner races 45 of bearings 50 are fixed into position onto axle 65.

Turning now to FIGS. 1 and 3, the manner in which the spokes are retained in flange portions 30 will be described in detail. Flange portion 30 includes a plurality of slots or grooves 70 formed into the outer face of flange portion 30. The slots 70 extend from a retention cavity 75 formed in the face of the flange portion 30 clear through the rim of the flange portion 30. For clarity, in FIG. 3, only four slots 70 and three retention cavities 75 are indicated with numerals.

Conveniently, two open slots 70 extend from each retention cavity 75, one extending generally tangential to an imaginary circle through the retention cavities in a clockwise direction, and one in a counterclockwise direction. The counterclockwise slots are somewhat deeper than the clockwise slots (the additional depth being approximately the width of the shafts of the straight pull spokes 35 to be placed in the slots). This permits the shafts of the straight pull spokes to cross each other without undue interference. Of course, the clockwise slots could be deeper instead of the counterclockwise slots. As depicted in FIGS. 1 and 3, there are 8 retention cavities and 16 slots, 8 of which are clockwise and 8 of which are counterclockwise.

The slots 70 and retention cavities 75 are intended for receiving straight pull spokes 35 in the manner depicted in FIGS. 1 and 3. The straight pull spokes 35 have a spoke shaft 85 and a mushroomed or otherwise enlarged spoke retention end 90. The spokes 35 can be dropped straight into the slots 70 and retention cavities 75, with the shaft 85 in the slot 70 and the enlarged retention end 90 in the retention cavity 75. Dropping the spokes into the slots is significantly easier than individually lacing 90 degree bend type spokes into holes in the hub and requires less skilled labor.

As depicted, the two "end pull" spokes can be installed in each recessed retention cavity and retention slot with the spokes exiting the spoke ring in generally opposite directions.

During installation, the spokes are dropped into the deeper slots in the spoke rings first and then into the shallower slots. Each spoke in turn preferably passes alongside a spoke from the adjacent recessed hole in such a manner that the spokes bear against each other. This forms a stronger spoke arrangement.

The retention cavity 75 is preferably large enough so that the retention ends of both the clockwise and counterclockwise spokes 35 fit into their common retention cavities 75 allowing them to move without interference between their enlarged ends 90. Since the enlarged retention end 90 of the spoke 35 is larger than the width of the slot into which it is placed, when a spoke 35 is attached to and tightened onto the wheel rim 100, the spoke 35 will be securely axially retained in the slot. The other end of the spoke terminates in a conventional threaded end (not shown) for a conventional threaded nipple (not shown) for attachment to wheel rim 100 in a conventional manner.

Once the spokes 35 are attached and tightened to the wheel rim, the tension on the spokes will tend to some degree to retain the spokes in the slots. However, as an added measure of security, the present invention preferrably includes a retention cap 110. Retention cap 110 has a flange portion 120 which covers the slots to prevent the spokes from accidentially falling out of their respective slots, in the event a spoke or the rim is flexed or bent. Preferrably, the flange portion 120 includes a rim portion 130 which is bent toward the hub flange portion and received into a corresponding circumferential groove 140 in the hub flange portion 30 to help retain the spokes in position. The retainer cap 110 is conveniently secured to the hub ring 25 by means of retainer cap screw 150, which are threaded into corresponding holes 155 in flange portion 30 of the the hub ring 25.

Preferably, as shown in FIG. 4, the retainer cap 110 also has an inwardly extending central lip 160, which presses against a washer 165, which in turn presses against the outer race 45 of bearing 50, holding it in position.

Referring again to FIG. 4, the non-rotating portion 20 of the hub assembly 10 will now be described. The non-rotating portion 20 includes an axle 65 extending between the down tube or rear frame member drop-out slots 170 of the frame of a bicycle or other HPV and held in the slots of drop out members 175 of those down tubes. The axle 65 may be solid or hollow, and has an unthreaded central portion 180 onto which are mounted a tubular bearing spacer 185 and a bushing 190. The inner race 195 of bearing 50 is conveniently mounted onto a central tubular portion of bushing 190 having an engagement ledge 200 for holding the inner races 195 of bearings 50 between the engagement ledge 200 and bearing spacer tube 185. The bearing spacer tube 185 may, of course, have whatever length is needed to provide the required spacing between the bearings 50 to suit individual requirements, and may be "mixed and matched" with the other parts of the modular hub assembly as required.

The bushing 190, if threaded, preferably has a concave outer end 205 adapted to receive the convex surface of a cone washer 210. Spacers 215 are disposed between each cone washer 210 and the frame member drop out portion 175. Spacers 215 have the appropriate length to take up the space between the cone washer 205 and the frame member drop out portion 175. Of course, spacer 215 can be mixed and matched with other components, as required.

The novel modular hub assembly of the present invention also includes provision for a quick-release feature, which avoids the need for a separate skewer required by the prior art. In the present invention, each end of the axle 65 is threaded. One end of the axle 65 (at the left end of FIG. 4) has an axle nut 220 thereon. The other threaded end of axle 65 has a cupped pressure plate 225 loosely placed onto the axle 65. A release assembly 230 having a lever 235 eccentrically mounted on a barrel shaped pivot nut 240 threaded onto the threaded end of axle 65 so that it acts as a cam. When the lever 235 is in the loose position (extending generally axially with the axle 65), the axle 65 is loose and may be readily removed from the drop out portion 175 of the frame. Pulling the lever 235 to the tightened position (generally perpendicular to the axle 65) forces the thicker portion of the cam surface of the eccentrically mounted lever against pressure plate 225. This puts tension on the axle 65, putting into compression all the elements in between, including the spacers 215, the cone washers 210, the bushings 190, the bearing spacer 185, and, of course, the frame drop out portions 175. Accordingly, the axle 65 is securely retained, but without the need for the separate skewer member required by the prior art.

Although a hollow axle 65 is disclosed, it is to be understood that a solid axle may be employed instead. However a hollow axle is preferred in the present invention.

One of the advantages of the hub assembly of the present invention is its ready "mix and match" adaptability to different desired configurations by changing of only one or a few parts. By use of a hollow axle a conventional quick release lever with a skewer (not shown) can be used, if desired, without the need to keep different axles in inventory.

The modular hub assembly 10 in accordance with the present invention can be readily adapted for use with disc brakes, threaded or splined adapters, or other configurations, by simply replacing one or a few of the parts of the hub asssembly. As a non-limiting example of this capability, FIG. 5 depicts a modular hub assembly 10' in accordance with the invention employing a splined adapter 240 and cassette body 245. A cassette body is a well-known drive element on bicycles and other HPV's, which incorporates a bearing and ratchet mechanism on its inside, and has provision for attachment of a sprocket stack (as for a 24 speed bicycle) on its outside. Accordingly, the splined adapter 240 and cassette body 245 are shown schematically only, to illustrate the manner in which the modular hub of the present invention can be readily adapted for different applications.

The hub assembly of FIG. 5 has been changed from that depicted in FIG. 4 in that the right hand bearing 50, right bushing 190, cone washer 205, right spacer 215, etc. have been replaced by a splined cassette adapter connector 250, the splined cassette body adapter 240, the cassette body 245, and its free wheel ratchet 255, ball bearing set 260 and bearing retainer nut 265. The spoke ring 25 need not be changed. The spoke retainer cap 110' is similar, but does not have the inwardly extending central lip 30, because such is not required where a cassette body is used. As depicted in FIG. 5, an optional washer 267 is included between the left hand hub ring 25 and retainer cap 110.

As another non-limiting example of the adaptability of the present invention, FIG. 6 depicts a modular hub assembly 10" in accordance with another embodiment of the invention employing a threaded freewheel adapter 270 (which connects to another type of cassette in common use). In this configuration, the right hand bearing 50 is unchanged from the FIG. 4 (i.e., the plain embodiment), as are the right hand bushing 190 and cone washer 210. The washer 165 is also employed, as before. However, in this embodiment, a threaded freewheel adapter 270 is employed, which has a flange portion 275 fitting into a recess in the outer face of the spoke ring 25. It should be noted that the spoke ring 25 is the same in this embodiment as it the embodiments shown in FIG. 4 and FIG. 5. In this embodiment, however, retainer cap 110' has no inwardly extending central lip 160, like the FIG. 5 embodiment. Instead, the washer 165 is retained in place in an engagement recess 280 of the threaded freewheel adapter, which is, in turn, securely retained in place by the flange portion of the spoke retaining cap 110', and by the retaining cap screws (not shown in FIG. 6).

If it is desired to use a disc brake 285 with the modular hub of the present invention, such may be readily threaded onto the threaded freewheel adapter, in the manner depicted in FIG. 7. The other components of the hub assembly are the same as in the FIG. 6 embodiment.

As can be seen from the foregoing, the present invention provides a modular hub that is universally adaptable to any wheel employing the use of standard rim brakes or any wheel with disc brake rotor attached, and/or with with all existing sprocket drive lines (freewheels, cassette bodies), in any configuration, by simply replacing or slightly modifying one or a few components. Furthermore, the present invention provides a unique design for use with straight pull spokes with no bends as well as a design that does not require individually lacing spokes through holes in the hub. Still further, the hub of the present invention is easier to assemble, and can supply a greater reactive force than that available when standard 90 degree bend spokes are installed. Still further, it can be seen that the present invention provides a hub assembly for a bicycle or other HPV which which does not require a quick-release skewer, but can still readily be adapted to use of a skewer, if desired.

Although the invention has been described in accordance with preferred embodiments, it will be seen by those skilled in the art that many modifications can be made within the spirit and scope of the present invention, and no intention is made to limit the scope of the present invention to any of these embodiments.

What is claimed is:

1. A spoke hub for bicycles and the like, comprising:
   a hub ring having an interior face and an exterior rim portion, and
   drop-in straight pull spokes each having a straight section and an enlarged retention end,
   said interior face of said hub ring having plurality of retention openings therein for receiving the straight section of said drop-in straight pull spokes, said retention openings being smaller than the enlarged retention end of said spokes to axially retain said spokes, wherein adjacent enlarged retention heads of respective spokes are retained in contiguous ones of said retention openings.

2. The spoke hub defined in claim 1, further comprising a retention cap having an interior face, said retention cap being affixed to said hub ring with its interior face adjacent said interior face of said hub ring to retain said spokes in place in their respective retention openings between said hub ring and said retention cap.

3. A spoked hub for bicycles and the like, comprising a pair of spaced apart split hub ring assemblies, each of said split hub ring assemblies having
   straight pull spokes having a straight section and an enlarged retention end,
   a first hub portion having an interior face and an exterior rim portion,
   said interior face of said first hub portion having a plurality of narrow open grooves, each having a width sized for receiving the straight section of said spokes, said grooves extending through said rim portion into a relatively larger opening for receiving the enlarged end of said spokes, said enlarged end of said spokes being larger than the width of said grooves so that said enlarged ends cannot be pulled through said grooves when said straight sections are received in said grooves, wherein adjacent enlarged retention heads of respective spokes are retained in contiguous ones of said relatively larger openings.

4. The spoked hub defined in claim 3, further comprising a second hub portion having an interior face, said second hub portion being affixed to said first hub portion with its interior face adjacent said interior face of said first hub portion to retain said spokes in place in their respective grooves between said first and second hub portions.

5. A spoked hub assembly for bicycles and the like, comprising a pair of spaced apart split hubs, each of said split hubs having
   straight pull spokes having a straight section and an enlarged retention end,
   a first hub portion having an interior face and an exterior rim portion,
   said interior face of said first hub portion having a plurality of open retention chambers for receiving the enlarged end of said straight pull spokes, said retention chambers being in communication with relatively smaller grooves extending through the exterior rim portion, said straight section of said straight pull spokes extending through said grooves, said grooves being narrower than said enlarged ends of said spokes to axially retain said spokes, wherein adjacent enlarged ends of respective spokes are retained in contiguous ones of said retention chambers.

6. The spoke hub assembly defined in claim 5, wherein each of said split hubs further comprises a second hub portion having an interior face, said second hub portion being affixed to said first hub portion with its interior face adjacent said interior face of said first hub portion to retain said spokes in place between said first and second hub portions.

7. A spoked hub for bicycles and the like, comprising a pair of spaced apart hub rings, each of said hub rings having
   a first side,
   a second side,
   a rim,
   a plurality of generally axial holes in said first side and being spaced radially about said first side on a first imaginary circle on said first side,
   a clockwise plurality of open slots in said first side, each of said open slots extending subtantially tangentially to a second imaginary circle from one of said generally axial holes clear to said rim,
   a counterclockwise plurality of open slots in said first side extending subtantially tangentially to said second imaginary circle from one of said generally axial holes clear to said rim,
   a plurality of clockwise spokes, each of said clockwise spokes having a retention end, a nipple end and a straight section, said retention end of each of said spokes being fittable into one of said generally axial holes with its straight section disposed in one of said clockwise spoke slots, said retention end being enlarged such that it will not slide through said slot, and
   a plurality of counterclockwise spokes, each of said counterclockwise spokes having a retention end, a nipple end and a straight section, said retention end of each spoke being fittable into one of said generally axial holes with its straight section of said spoke disposed in one of said counterclockwise open slots, said retention end being enlarged such that it will not slide through said slot, wherein adjacent retention ends of respective spokes are retained in contiguous ones of said axial holes.

8. The spoked hub defined in claim 7, further comprising a retainer cap affixed to said hub ring to retain said retention ends of said clockwise and counterclockwise spokes in said generally axial holes.

9. The spoked hub defined in claim 8, wherein each of said counterclockwise open slots is deeper than said clockwise open slots.

10. A modular, spoked hub assembly for bicycles and the like, comprising
    a rotating assembly including
        a first hub ring including a face having a plurality of retention slots for receiving and axially retaining drop-in straight pull spokes, a bore and a seat for receiving and seating the outer race of a first bearing, and means for retaining said outer race against said seat;

a second hub ring, including a face having retention slots for receiving and axially retaining drop-in straight pull spokes, a bore and a seat for interchangeably receiving and seating a first member taken from the group of the outer race of a second bearing and a connector for a splined cassette body adapter, or being left left unused;

a recess for interchangeably receiving a second member taken from the group of a splined cassette body adapter, a threaded cassetter adapter, and a threaded disk brake adapter, or being left unused and means for retaining said second member against said hub ring with said first member sandwiched between a portion of said second member and said seat of said first member;

a tube disposed between said first and second hub rings to axially position them in spaced apart relationship;

a non-rotating assembly including
an axle,
a bearing spacer tube,
a first washer on said axle to bear on the inner race of said first bearing, between said threaded nut and said bearing spacer tube, and
a second washer on said axle to interchangeably retain a member taken from the group of the inner race of said second bearing and a connector for a splined cassette adapter.

11. The modular, spoked hub defined in claim 10, further comprising first and second spacers on said axle, respectively outboard of said first and second washers, said axle including a nut threaded onto one distal end, a pivot nut threaded onto the other distal end, a cupped washer, and a quick-release lever eccentrically mounted onto said pivot nut and bearing on said cupped washer, said quick-release lever having a first position where said assembly is loose and a second position where said assembly is tightened onto frame drop out members.

12. The modular, spoked hub defined in claim 11, wherein said axle is hollow.

13. The modular, spoked hub defined in claim 12, further comprising a skewer through said axle.

14. The modular, spoked hub defined in claim 10, wherein said means for retaining said outer race of said first bearing against said seat is a retainer cap.

15. The modular, spoked hub defined in claim 14, wherein said retainer cap also retains said straight pull drop-in spokes in said retainer slots.

* * * * *